US012710590B2

(12) United States Patent
Sun et al.

(10) Patent No.: US 12,710,590 B2
(45) Date of Patent: Aug. 18, 2026

(54) ON-CHIP STRUCTURE FOR FIBER ARRAY ALIGNMENT BY ASSISTING EDGE COUPLER INDEX-MATCHING EPOXY/OIL FILLING

(71) Applicant: Finisar Shanghai Incorporation, Shanghai (CN)

(72) Inventors: Yao Sun, Shanghai (CN); Jianhu Wei, Shanghai (CN); Po Dong, Shanghai (CN); Taylor Fryett, Shanghai (CN); Wei Si, Shanghai (CN); Shanshan Zeng, Shanghai (CN); Tony Shi, Shanghai (CN); Linjie Zhou, Shanghai (CN); Yu Li, Shanghai (CN)

(73) Assignee: FINISAR SHANGHAI INCORPORATION (CN)

( * ) Notice: Subject to any disclaimer, the term of this patent is extended or adjusted under 35 U.S.C. 154(b) by 83 days.

(21) Appl. No.: 18/371,172

(22) Filed: Sep. 21, 2023

(65) Prior Publication Data

US 2025/0076576 A1 Mar. 6, 2025

(30) Foreign Application Priority Data

Aug. 31, 2023 (CN) ......................... 202311122343.0

(51) Int. Cl.
*G02B 6/13* (2006.01)

(52) U.S. Cl.
CPC ...................................... *G02B 6/13* (2013.01)

(58) Field of Classification Search
CPC ........................................................ G02B 6/13
USPC ........................................................... 385/49
See application file for complete search history.

(56) References Cited

U.S. PATENT DOCUMENTS

2004/0103950 A1* 6/2004 Iriguchi ................... G02B 1/06 356/73.1
2012/0076465 A1* 3/2012 Chen .................... G02B 6/1228 385/124
2017/0293073 A1* 10/2017 Chen ...................... G02B 6/138
2018/0180818 A1* 6/2018 Jiang .................... G02B 6/1228

* cited by examiner

*Primary Examiner* — Jerry M Blevins
(74) *Attorney, Agent, or Firm* — McAndrews Held & Malloy, Ltd.

(57) ABSTRACT

Embodiments of the present disclosure may comprise a system for filling undercuts with an index-matching liquid on a wafer, the system comprising a plurality of edge couplers, each comprising an undercut and a waveguide. Embodiments may also comprise ribs that suspend the waveguide over the undercut. Embodiments may also comprise one or more main buckets and one or more monitor buckets. Embodiments may also comprise a duct that couples together the plurality of edge couplers, the one or more main buckets, and the one or more monitor buckets.

19 Claims, 5 Drawing Sheets

ON-CHIP STRUCTURE FOR FIBER ARRAY ALIGNMENT BY ASSISTING EDGE COUPLER INDEX-MATCHING EPOXY/OIL FILLING

TECHNICAL FIELD

The present disclosure generally relates to an on-chip structure for fiber array alignment by assisting edge coupler index-matching epoxy/oil filling.

BACKGROUND

Aspects of the present disclosure relate to an on-chip structure for fiber array alignment by assisting edge coupler index-matching epoxy/oil filling. Various issues may exist with conventional solutions for on-chip structures for fiber array alignment by assisting edge coupler index-matching epoxy/oil filling. In this regard, conventional systems and methods for on-chip structures for fiber array alignment by assisting edge coupler index-matching epoxy/oil filling may be costly, cumbersome, and/or inefficient.

Limitations and disadvantages of conventional systems and methods will become apparent to one of skill in the art, through comparison of such approaches with some aspects of the present methods and systems set forth in the remainder of this disclosure with reference to the drawings.

BRIEF SUMMARY OF THE DISCLOSURE

Shown in and/or described in connection with at least one of the figures, and set forth more completely in the claims are on-chip structures for fiber array alignment by assisting edge coupler index-matching epoxy/oil filling.

DETAILED DESCRIPTION

Figure 1A:
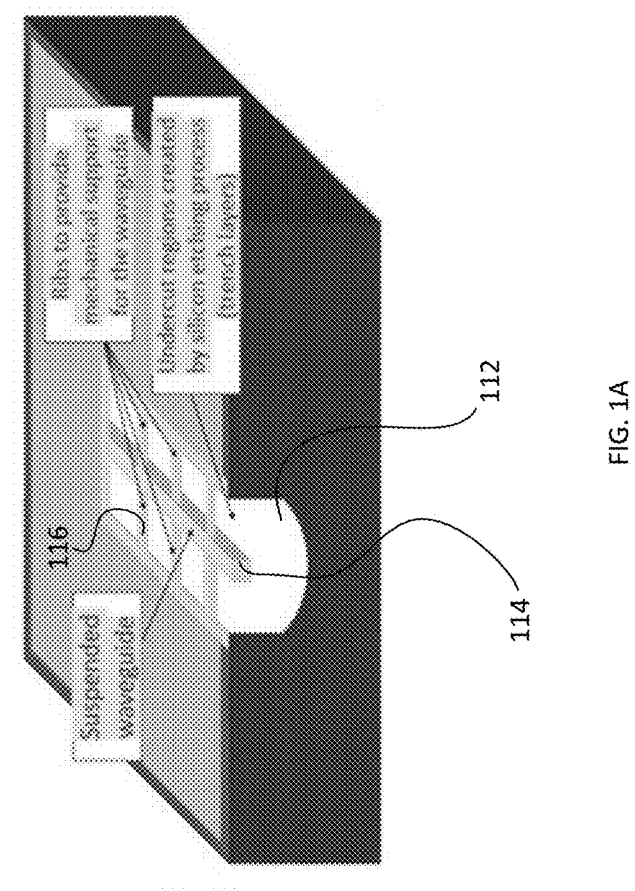
FIG. 1A is a 3D drawing of an exemplary edge coupler 110, according to some embodiments of the present disclosure.

The following discussion provides various examples of semiconductor devices and methods of manufacturing semiconductor devices. Such examples are non-limiting, and the scope of the appended claims should not be limited to the particular examples disclosed. In the following discussion, the terms "example" and "e.g." are non-limiting.

The figures illustrate the general manner of construction, and descriptions and details of well-known features and techniques may be omitted to avoid unnecessarily obscuring the present disclosure. In addition, elements in the drawing figures are not necessarily drawn to scale. For example, the dimensions of some of the elements in the figures may be exaggerated relative to other elements to help improve understanding of the examples discussed in the present disclosure. The same reference numerals in different figures denote the same elements.

The term "or" means any one or more of the items in the list joined by "or". As an example, "x or y" means any element of the three-element set {(x), (y), (x, y)}. As another example, "x, y, or z" means any element of the seven-element set {(x), (y), (z), (x, y), (x, z), (y, z), (x, y, z)}.

The terms "comprises," "comprising," "includes," and/or "including," are "open ended" terms and specify the presence of stated features, but do not preclude the presence or addition of one or more other features.

The terms "first," "second," etc. may be used herein to describe various elements, and these elements should not be limited by these terms. These terms are only used to distinguish one element from another. Thus, for example, a first element discussed in this disclosure could be termed a second element without departing from the teachings of the present disclosure.

Unless specified otherwise, the term "coupled" may be used to describe two elements directly contacting each other or describe two elements indirectly connected by one or more other elements. For example, if element A is coupled to element B, then element A can be directly contacting element B or indirectly connected to element B by an intervening element C. Similarly, the terms "over" or "on" may be used to describe two elements directly contacting each other or describe two elements indirectly connected by one or more other elements.

Figure 1:
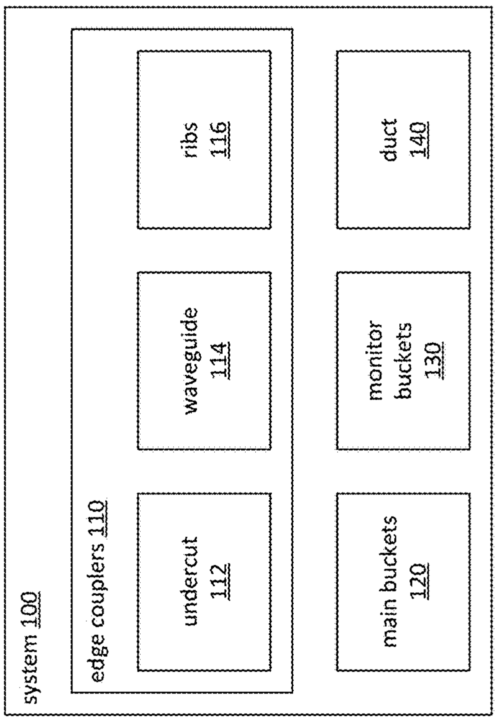
FIG. 1 is a block diagram illustrating a system, according to some embodiments of the present disclosure.

FIG. 1 is a block diagram that describes a system 100, according to various embodiments of the present disclosure. In some embodiments, the system 100 may comprise a plurality of edge couplers 110, one or more main buckets 120, one or more monitor buckets 130, and a duct 140. The plurality of edge couplers 110 may comprise an undercut 112, a waveguide 114, and ribs 116 that suspend the waveguide 114 over the undercut 112. The duct 140 couples together the plurality of edge couplers 110, the one or more main buckets 120, and the one or more monitor buckets 130.

The system 100 may be a photonics integrated circuit, for example. The edge couplers 110 may be operable to couple a waveguide 114 from the photonic integrated circuit (PIC)/wafer to an external device. The etching process on the wafer, for example in a silicon photonics process, may result in an undercut 112 under the waveguide 114. The waveguide 114 may be operable to carry optical signals, for example single mode, and may be structured as a single mode fiber. In some embodiments, the wafer may be a silicon photonics wafer.

FIG. 1A shows an exemplary illustration of an edge coupler 110. Similar reference numbers refer to similar elements as in FIG. 1.

Figure 1B:
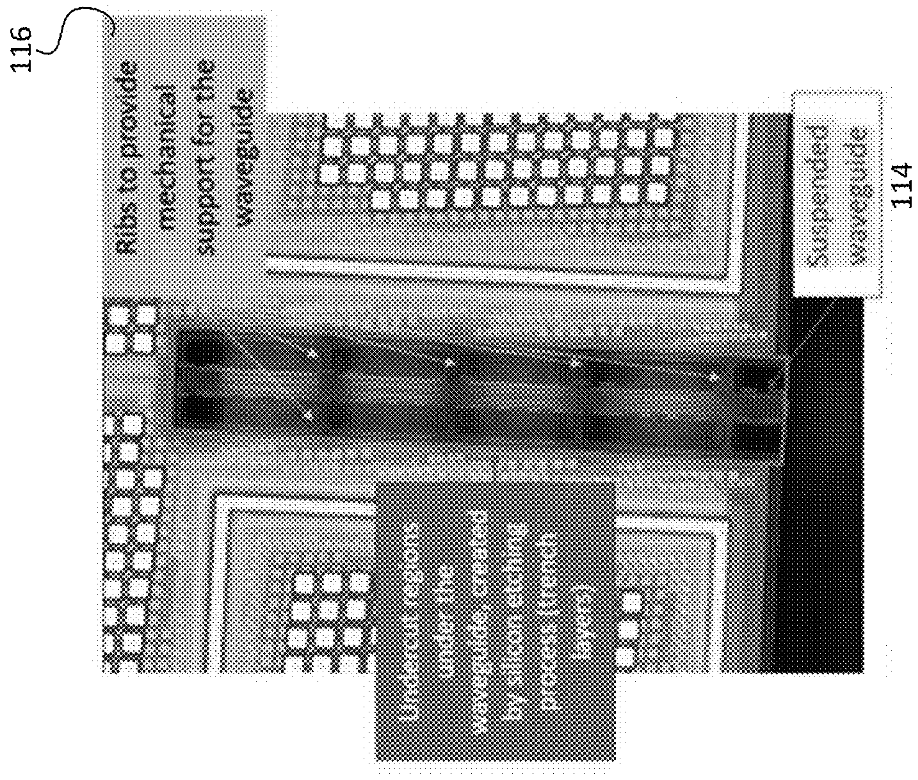
FIG. 1B is a photograph of a top-view onto an edge coupler 110, according to some embodiments of the present disclosure.

FIG. 1B shows a top view of an edge coupler 110. Similar reference numbers refer to similar elements as in FIG. 1.

Typically, the modal field diameter (MFD) of edge couplers 110 may be approximately 4 micrometers, which may lead to inefficient fiber coupling. To enlarge the MFD to approximately 9 micrometers for better fiber coupling efficiency and better alignment tolerance with the external device to be connected, one approach may be to fill the undercuts 112 of edge couplers 110 with index-matching epoxy or oil.

Correspondingly, the filling of the undercuts 112 with the index-matching liquid may increase a mode field diameter at the facet of the waveguides. A mode field diameter at the facet of the waveguide 114 may be approximately 4 micrometers without the index-matching liquid, for example. In some embodiments, a mode field diameter at the facet of the waveguide 114 may be approximately 9 micrometers with the index-matching liquid.

This process may comprise making undercuts 112 during wafer fabrication, and then filling the undercuts 112 with an epoxy/oil before alignment of PIC with an external device that may be coupled. The epoxy/oil filling process may be very delicate because the undercut 112 cavity may be very small, and may require high precision tooling and/or manual operation. Another problem may be to monitor the epoxy/oil filling process and quality. For example, it may be difficult to determine whether the amount of epoxy/oil present may be enough to encapsulate the edge coupler's 110 waveguide 114 region.

Figure 2A:
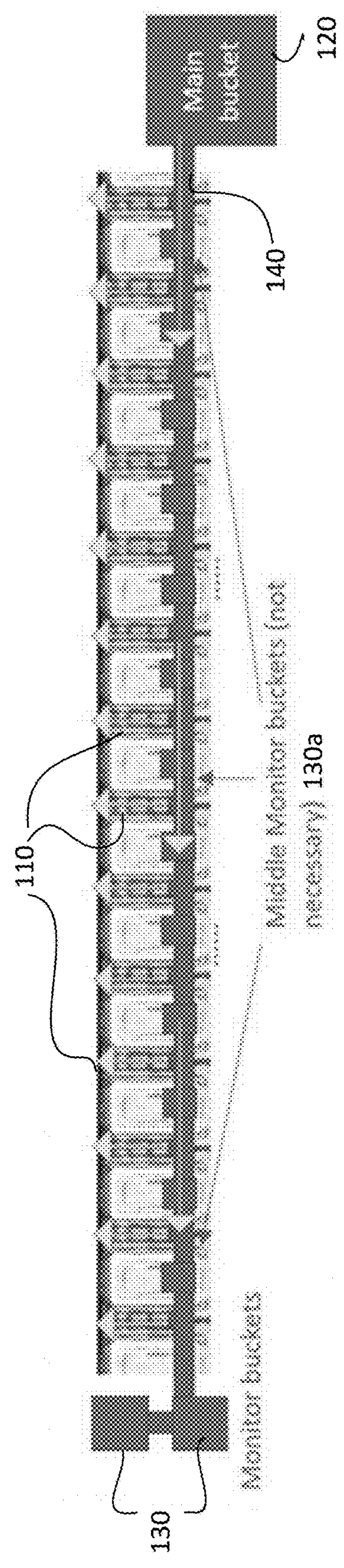
FIG. 2A-FIG. 2D are exemplary systems according to some embodiments of the present disclosure.

FIG. 2A shows an exemplary system for filling index-matching liquids. In some embodiments, the system 100 may comprise a plurality of edge couplers 110 (14 are shown and 3 are labelled), one or more main buckets 120, one or more monitor buckets 130, one or more middle monitor buckets 130*a*, and a duct 140. The duct 140 couples together the plurality of edge couplers 110, the one or more main buckets 120, the middle monitor buckets 130*a*, and the one or more monitor buckets 130.

The duct 140 may be a cavity operable to fill the undercuts 112 of the edge couplers 110, by forming a communicating vessel with the undercuts 112, the main buckets 120, the monitor buckets 130, 130*a*, and the duct 140. By adding an index-matching liquid to the main buckets 120, the index-matching liquid may flow from the main bucket 120 through the duct 140 to fill the undercuts 112 of the edge couplers 110, the middle monitor buckets 130*a* and the monitor buckets 130. By adding index-matching liquid to the main bucket 120, the undercuts 112, middle monitor buckets 130*a* closer to the main bucket 120 will be filled first. The monitor buckets 130 separated the most distance from the main bucket 120 may be filled last in time.

The main bucket 120 may be a cavity operable to add index-matching liquid into the system 100. Specifically, the opening of the main bucket 120 may be chosen large enough to easily add index-matching liquid into the system 100. In some embodiments, the opening may be the shape of a square with a side length of 0.5 millimeters. In some embodiments, the opening may be the shape of a circle with a diameter of 0.5 millimeters. The opening of the main bucket 120 may be suitable for the filling with the index-matching liquid by an automatic aligner. In some embodiments, the index-matching liquid may be an oil or an epoxy.

The monitor buckets 130, 130*a* may be cavities with an opening to monitor the filling process. The opening of the monitor buckets 130 may be chosen so that the fill level of the system 100 may be verified. Because the undercuts 112 and the openings between ribs may be very small and because of the ribs 116 and the waveguide 114, it may be more difficult to verify the fill status of the system 100 directly by observing from the top openings of the undercuts 112 under edge couplers 110. Thus, it may be advantageous to use monitor buckets 130, 130*a*. A separation distance between at least one of the one or more monitor buckets 130 and at least one of the one or more main buckets 120 may be greater than the separation distance between any one of the undercuts 112 and any of the one or more main buckets 120. In other words, to ensure that the fill status of the monitor buckets 130 may be indicative of the fill status of the undercuts 112, the monitor buckets 120 may be separated a larger distance than the undercuts 112 from the main buckets 120 used for filling. In some embodiments, there may be middle monitor buckets 130*a* that may be used to monitor intermediate fill statuses, accordingly.

It may be advantageous for filling that the plurality of undercuts 112, the one or more main buckets 120, and the one or more monitor buckets 130, 130*a*, and the duct 140 may be formed on a same layer of the wafer and/or may be of the same depth.

Figure 2B:
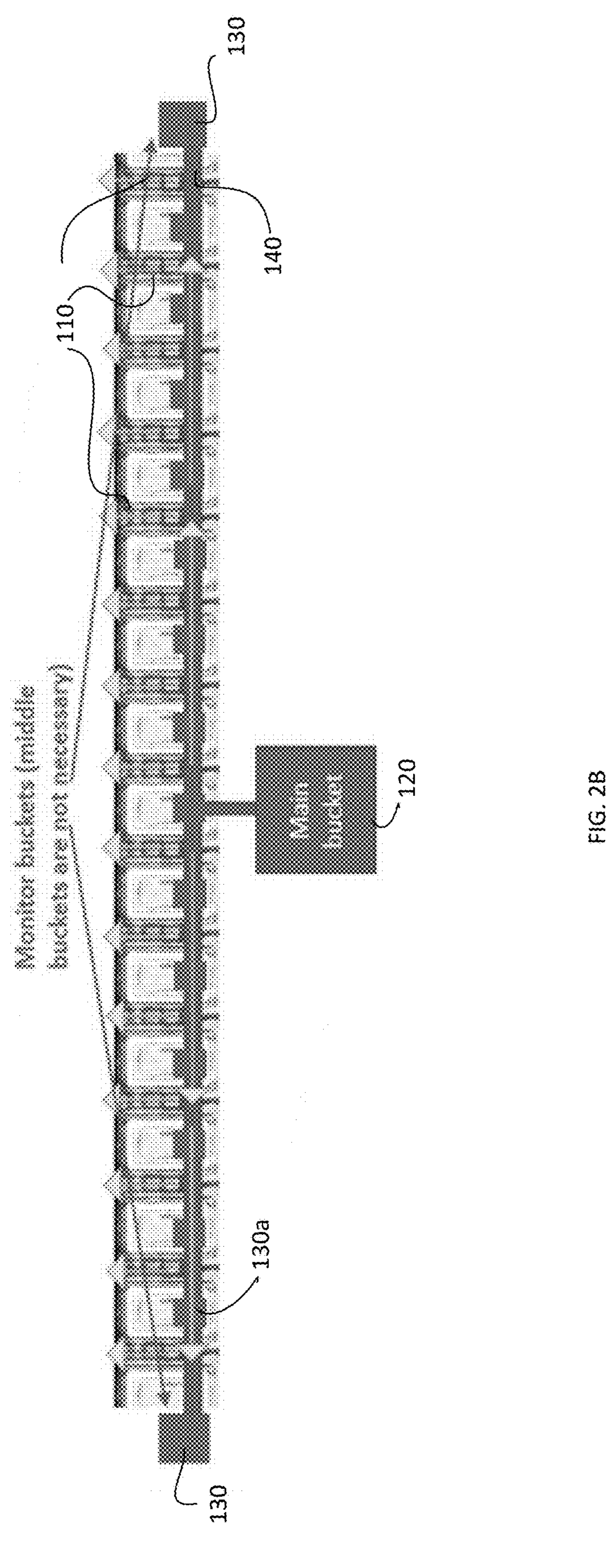
Figure 2C:
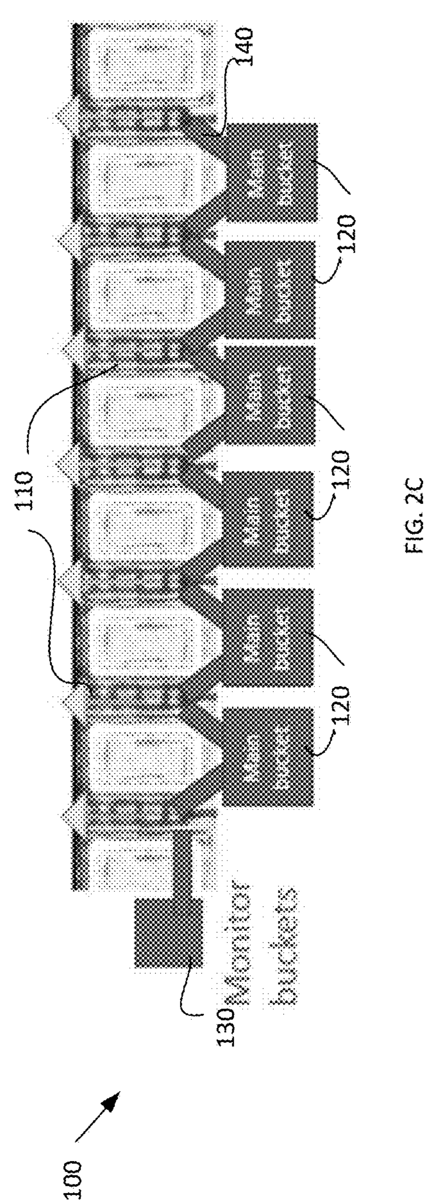
Figure 2D:
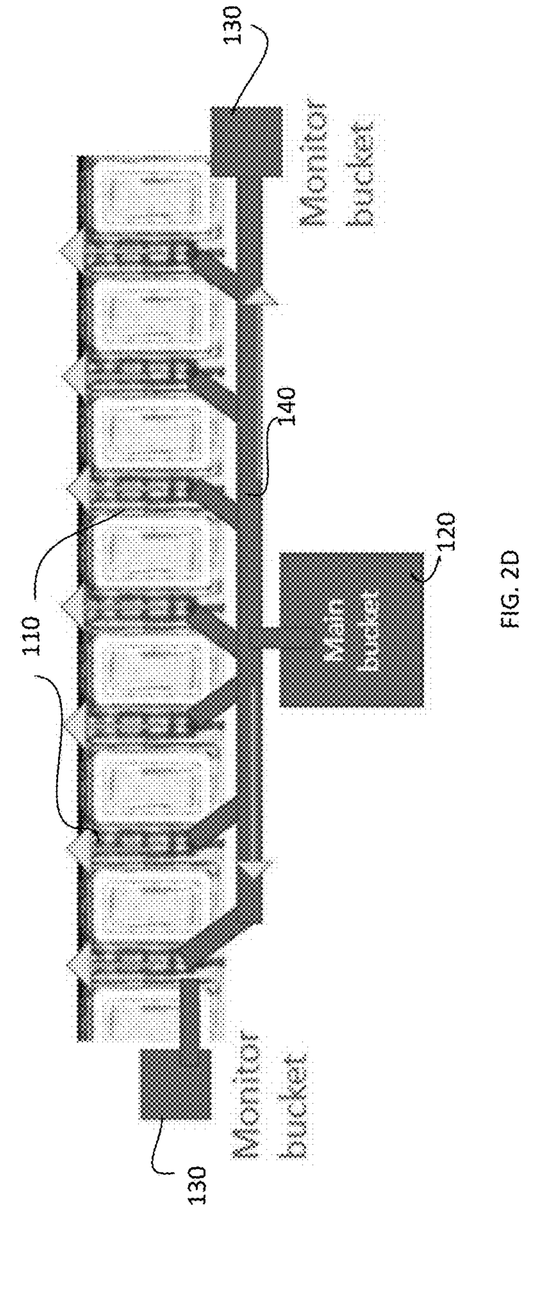

As will be clear to the person skilled in the art, many different arrangements of the system 100 may be envisaged, some which may be illustrated in FIG. 2B-2D.

FIG. 2B shows an exemplary system 100. The same reference numbers may indicate similar elements to those shown in other figures. In FIG. 2B, a main bucket 120 may be located between two monitor buckets 130 and then upon filling, the index-matching liquid may flow in two directions, from the main bucket 120 to both monitor buckets 130.

FIG. 2C shows an exemplary system 100. The same reference numbers may indicate similar elements to those shown in other figures. In FIG. 2C, an exemplary system 100 may be illustrated with a plurality of main buckets.

FIG. 2D shows an exemplary system 100. The same reference numbers may indicate similar elements to those shown in other figures. In FIG. 2D, an exemplary system 100 may be shown with an alternative duct 140 shape.

The present disclosure includes reference to certain examples, however, it will be understood by those skilled in the art that various changes may be made and equivalents may be substituted without departing from the scope of the disclosure. In addition, modifications may be made to the disclosed examples without departing from the scope of the present disclosure. Therefore, it is intended that the present disclosure not be limited to the examples disclosed, but that the disclosure will include all examples falling within the scope of the appended claims.

What is claimed is:

1. A system comprising:

a plurality of edge couplers, each comprising an undercut formed beneath a waveguide, wherein ribs suspend the waveguide over the undercut;

one or more main buckets configured to receive an index-matching liquid;

one or more monitor buckets; and a duct that couples together the plurality of edge couplers, the one or more main buckets, and the one or more monitor buckets, wherein;

the duct fluidically interconnects the undercuts of the plurality of edge couplers with the one or more main buckets and the one or more monitor buckets to form a network of communicating vessels such that a hydrostatic pressure of the index-matching liquid equalizes across the plurality of edge couplers, and the duct forms communicating vessels between the plurality of edge couplers, the one or more main buckets, and the one or more monitor buckets, such that the index-matching liquid introduced through the one or more main buckets is directed to flow through the duct to simultaneously fill the undercuts of the plurality of edge couplers and flow to the one or more monitor buckets, thereby assisting uniform filling and monitoring of the index-matching liquid across multiple edge couplers on a wafer.

2. The system of claim 1, wherein said index-matching liquid is an oil or an epoxy.

3. The system of claim 1, wherein said one or more main buckets comprise an opening to add said index-matching liquid into said system.

4. The system of claim 3, wherein said opening is the shape of a square with a side length of 0.5 millimeters.

5. The system of claim 3, wherein said opening is the shape of a circle with a diameter of 0.5 millimeters.

6. The system of claim 3, wherein said opening is suitable for said filling with said index-matching liquid by an automatic station.

7. The system of claim 1, wherein said one or more monitor bucket comprise an opening to monitor said filling process.

8. The system of claim 1, wherein a separation distance between at least one of said one or more monitor buckets and at least one of said one or more main buckets is greater than the separation distance between any one of said undercuts and any of said one or more main buckets.

9. The system of claim 1, wherein said plurality of undercuts, said one or more main buckets, and said one or more monitor buckets are formed on a same layer of said wafer.

10. The system of claim 1, wherein said plurality of undercuts, said one or more main buckets, and said one or more monitor buckets are of a same depth.

11. The system of claim 1, wherein said coupling by said duct forms communicating vessels from said plurality of edge couplers, said one or more main buckets, and said one or more monitor buckets.

12. The system of claim 1, wherein said filling of said undercuts with said index-matching liquid increases a mode field diameter at the facet of said waveguides.

13. The system of claim 1, wherein a mode field diameter at the facet of said waveguide is approximately 4 micrometers without said index-matching liquid.

14. The system of claim 1, wherein a mode field diameter at the facet of said waveguide is approximately 9 micrometers with said index-matching liquid.

15. The system of claim 1, wherein a photonic integrated circuit comprises said system.

16. The system of claim 1, wherein said wafer is a silicon photonics wafer.

17. The system of claim 1, wherein the duct comprises a continuous channel extending along a row of the plurality of edge couplers such that each undercut is fluidically coupled to adjacent undercuts.

18. The system of claim 1, wherein the one or more monitor buckets are positioned at distal ends of the duct relative to the one or more main buckets to indicate completion of filling.

19. The system of claim 1, wherein the duct is formed in a same lithographic layer as the undercuts to maintain uniform capillary flow characteristics.

* * * * *